US007738550B2

(12) United States Patent
Kuhn

(10) Patent No.: US 7,738,550 B2
(45) Date of Patent: Jun. 15, 2010

(54) METHOD AND APPARATUS FOR GENERATING COMPACT TRANSCODING HINTS METADATA

(75) Inventor: Peter Kuhn, Tokyo (JP)

(73) Assignee: Sony Corporation, Tokyo (JP)

( * ) Notice: Subject to any disclaimer, the term of this patent is extended or adjusted under 35 U.S.C. 154(b) by 2173 days.

(21) Appl. No.: 10/009,119

(22) PCT Filed: Mar. 13, 2001

(86) PCT No.: PCT/JP01/01982

§ 371 (c)(1),
(2), (4) Date: May 7, 2002

(87) PCT Pub. No.: WO01/69936

PCT Pub. Date: Sep. 20, 2001

(65) Prior Publication Data

US 2002/0157112 A1 Oct. 24, 2002

(30) Foreign Application Priority Data

Mar. 13, 2000 (JP) ............................. 2000-068720

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................. 375/240.01
(58) Field of Classification Search ............ None
See application file for complete search history.

(56) References Cited

U.S. PATENT DOCUMENTS

| 5,546,129 | A | * | 8/1996 | Lee ..................... 375/240.16 |
| 5,805,224 | A | | 9/1998 | Keesman et al. |
| 5,808,570 | A | | 9/1998 | Bakhmutsky |
| 5,838,664 | A | | 11/1998 | Polomski |
| 5,870,146 | A | | 2/1999 | Zhu |
| 6,058,143 | A | * | 5/2000 | Golin ................... 375/240.16 |
| 6,735,253 | B1 | * | 5/2004 | Chang et al. ........... 375/240.16 |
| 2002/0196583 | A1 | * | 12/2002 | Pinarbasi .................. 360/110 |

FOREIGN PATENT DOCUMENTS

JP 2000-059788 2/2000

(Continued)

OTHER PUBLICATIONS

"Proposed SMPTE Standard for Television-MPEG-2 Video Recoding Data Set" SMPTE Journal, SMPTE Inc. Scarsdale, N.Y., US, vol. 109, No. 2, Feb. 2000, pp. 146-150, XP000913023.

(Continued)

*Primary Examiner*—Nhon T Diep
(74) *Attorney, Agent, or Firm*—Finnegan, Henderson, Farabow, Garrett & Dunner, LLP

(57) ABSTRACT

An audio/video (or audiovisual, "A/V") signal processing apparatus and method for extracting a compact representation of a multimedia description and transcoding hints metadata for transcoding between different (e.g., MPEG) compressed content representations, manipulating (e.g., MPEG compressed) bitstream parameters such as frame rate, bit rate, session size, quantization parameters, and picture coding type structure (e.g., group of pictures, or "GOP"), classifying A/V content, and retrieving multimedia information.

35 Claims, 13 Drawing Sheets

FOREIGN PATENT DOCUMENTS

| WO | WO 95/35628 A | 12/1995 |
| --- | --- | --- |
| WO | WO 98/38800 A | 9/1998 |
| WO | WO 98/52356 | 11/1998 |
| WO | WO 98 52356 | 11/1998 |
| WO | WO 99/05870 A2 | 2/1999 |
| WO | WO 99/23560 A1 | 5/1999 |
| WO | WO 99/29113 A | 6/1999 |
| WO | WO 99/33268 | 7/1999 |
| WO | WO 99/38314 | 7/1999 |
| WO | WO 99/43162 A | 8/1999 |
| WO | WO 99/57673 A2 | 11/1999 |

OTHER PUBLICATIONS

Gunsel B et al: "Content-Based Access to Video Objects: Temporal Segmentation, Visual Summarization, and Feature Extraction" Signal Processing. European Journal Devoted to the Methods and Applications of Signal Processing, Elsevier Science Publishers B.V. Amsterdam, NL, vol. 66, No. 2, Apr. 30, 1998, pp. 261-280, XP004129645.

Chun K W et al: "An Adaptive Perceptual Quantization Algorithm for Video Coding" IEEE 1993 International Conference on Consumer Electronics. ICCE, Rosemont, IL, USA, Jun. 8-10, 1993, vol. 39, No. 3, pp. 555-558, XP002180113.

Wee S J et al: "Field-To-Frame Transcoding With Spatial and Temporal Downsampling" Proceedings 1999 International Conference on Image Processing. ICIP'99. Kobe, Japan, Oct. 24-28, 1999, International Conference on Image Processing, Los Alamitos, CA: IEEE, US, vol. 4 of 4, Oct. 24, 1999, pp. 271-275, XP 000895525.

ISO/IEC AD HOC Group on MPEG-4 Video VM Editing: "MPEG-4 Video Verification Model Version 13.0 ISO/IEC JTC1/SC29/WG11 MPEG97/N2687" International Organization for Standardization—Organisation Internationale De Normalisation, Mar. 1999, pp. 1-347, XP002177336.

Bharadvaj et al.; "An Active Transcoding Proxy to Support Mobile Web Access"; Proceedings of the 17th IEEE Symposium on Reliable Distributed Systems, West Lafayette, Indiana, Oct. 1998, pp. 118-123, XP010319076.

* cited by examiner

Table 1: Transcoding Hints State Table (example)

| State | M | bitrate_fraction_for_I | bitrate_fraction_for_p |
|---|---|---|---|
| 1 | 5 | 0.8 | 0.15 |
| 2 | 4 | 0.85 | 0.1 |
| 3 | 3 | 0.9 | 0.05 |

1: bitrate <int>
2: size_of_pictures <2*int>
3: number_of_frames_per_second <int>
4: pel_aspect_ratio <float>
5: pel_colour_depth <int>
6: usage_of_progressive_interlaced_format <1 bit>
7: usage_of_frame_field_pictures <1bit>
8: compression method <int>
9:     one out of list {MPEG-1, MPEG-2, MPEG-4, DV, H.263, H.261, .... }
10:    { further parameters for compression method }
11:    GOP_structure (Runlength coding)

```
1: bitrate <int>
2: size_of_pictures <2*int>
3: number_of_frames_per_second <int>
4: pel_aspect_ratio <float>
5: pel_colour_depth <int>
6: usage_of_progressive_interlaced_format <1 bit>
7: usage_of_frame_field_pictures <1bit>
8: compression_method <int>
9:      one_out_of_list {MPEG-1, MPEG-2, MPEG-4, DV, H.263, H.261, .... }
10:     { further parameters for compression method }
11:     GOP_structure (Runlength coding)
```

FIG.12

```
1: use_region_of_interest_DS: <1bit>
2:       region_of_interest DS:
3:           shape_D: select one or {boundary_box_D, MB_shape_D, shape_D}
4:           motion_trajectory_D
5:
6:  use_editing_effects_transcoding_hints_DS: <1bit>
7:         camera_flash {frame1, frame2, .... framek} <k*int>
8:         cross_fading {(start_frame, end_frame), ... } <k*(<int>, <int>)>
9:         black_pictures {(start_frame, end_frame), ... <k*(<int>, <int>)>
10:        fade_in {(start_frame, end_frame), ... } <k*(<int>, <int>)>
11:        fade_out {(start_frame, end_frame), ... } <k*(<int>, <int>)>
12:        abrupt_change {frame1, frame2, .... framek} <k*int>
13:
14: use_motion_transcoding_hints_DS: <1 bit>
15:        number_of_regions: <int>
16:           for_every_region:
17:               is_region_rectangular_shaped (y/n) : <1bit>
18:               if_arbitrarily shaped: use region D for this region
19:               describe parametric object motion for this region
```

FIG.13

1: start_frame <int>
2: nframes <int>
3: I_frame_location:
4:     select_one_out_of_the_following: <2 bit>
5:         first frame (default)
6:         list of frames {frame1, frame2, ...., framek} <k*int>
7:         first_frame_and_every_k_frames <int>
8:         no_I_frame
9: quantizer_scale <int>
10: target_bitrate <int>
11: target_min_bitrate <int>
12: target_max_bitrate <int>
13: use_transcoding_states (y/n) <1 bit>
14: transcoding_state_nr <int>
15: add_new_transcoding_state (y/n) <1bit>
16:     if yes: {list of parameters}
17: remove_transcoding_state (y/n) <1bit>
18:     if yes: state_nr <int>
19: use_encoding_complexity_description (y/n) <1 bit>
20:     if yes: encoding_complexity_description_scheme

FIG.14

```
1:  use_feature_points (y/n) <1bit>
2:      select_feature_point_method <2 bits>
3:          number_of_new_feature_points <nframes * int>
4:          feature_point_metrics {mean, max, min, var, stddev} <5* int>
5:  use_equation_description (y/n) <1bit>
6:  use_motion_description (y/n) <1bit>
7:      select_motion_method <4 bits>
8:          param_k_motion <nframes * k * int>
9:          motion_metrics {min, max, sum, var, stddev} <5*int>
10:         block_motion_field < nframes*int*size_x*size_y / (m*m) >
11: use_texture_edge_metrics (y/n) <1bit>
12:     select_texture_edge_metrics <4 bits>
13:         DCT_block_energy <size_y*size_x*nframes*int/64>
14:         DCT_block_activity <size_y*size_x*nframes*int/64>
15:         DCT_energy_metric {mean, min, max, sum, var, stddev} <6*int>
16:         DCT_activity_metric {mean, min, max, sum, var, stddev} <6*int>
```

FIG.15

```
1:  M: I/P distance <int>
2:  bitrate_fraction_for_I <float>
3:  bitrate_fraction_for_P <float>/* bitrate_fraction of B is rest to 100 %)
4:  quantizer_scale_ratio_I_P <float>
5:  quantizer_scale_ratio_I_B <float>
6:  if_frame:   /* see target format transcoding hints */
7:      X_I, X_P, X_B  <3*int> /* frame_vbv_complexities */
8:  if_field:
9:      X_I_top, X_P_top, X_B_top  <3*int> /* field_top_vbv_complexities */
10:     X_I_bot, X_P_bot, X_B_bot  <3*int> /* field_bottom_vbv_complexities */
```

FIG.16

METHOD AND APPARATUS FOR GENERATING COMPACT TRANSCODING HINTS METADATA

TECHNICAL FIELD

The present invention relates to an audio/video (or audio-visual, "A/V") signal processing method and an A/V signal processing apparatus for extracting a compact representation of a multimedia description and transcoding hints metadata for transcoding between different (e.g., MPEG) compressed content representations, manipulating (e.g., MPEG compressed) bitstream parameters such as frame rate, bit rate, session size, quantization parameters, and picture coding type structure, such as group of pictures, or "GOP", classifying A/V content, and retrieving multimedia information.

BACKGROUND ART

A/V content is increasingly being transmitted over optical, wireless, and wired networks. Since these networks are characterized by different network bandwidth constraints, there is a need to represent A/V content by different bit rates resulting in varying subjective visual quality. Additional requirements on the compressed representation of A/V content are imposed by the screen size, computational capabilities, and memory constraints of an A/V terminal.

Therefore, A/V content stored in a compressed format, e.g., as defined by Moving Pictures Experts Group ("MPEG"), must be converted to, e.g., different bit rates, frame rates, screen sizes, and in accordance with varying decoding complexities and memory constraints of different A/V terminals.

To avoid the need for storing multiple compressed representations of the same A/V content for different network bandwidths and different A/V terminals, A/V content stored in a compressed MPEG format may be transcoded to a different MPEG format.

With respect to video transcoding, reference is made to the following:

W009838800A1: O. H. Werner, N. D. Wells, M. J. Knee: Digital Compression Encoding with improved quantization, 1999, proposes an adaptive quantization scheme;

U.S. Pat. No. 5,870,146: Zhu; Qin-Fan: Device and method for digital video transcoding, 1999;

W009929113A1: Nilsson, Michael, Erling; Ghanbari, Mohammed: Transcoding, 1999;

U.S. Pat. No. 5,805,224: Keesman; Gerrit J, Van Otterloo; Petrus J.: Method and Device for Transcoding Video Signal, 1998;

W009943162A L Golin, Stuart, Jay: Motion vector extrapolation for transcoding video sequences, 1999;

U.S. Pat. No. 5,838,664: Polomski; Mark D.: Video teleconferencing system with digital transcoding, 1998;

W009957673A2: Balliol, Nicolas: Transcoding of a data stream, 1999;

U.S. Pat. No. 5,808,570: Bakhmutsky; Michael: Device and Method for pair-matching Huffman-Transcoding and high performance variable length decoder with two-word bitstream segmentation which utilizes the same, 1998;

W009905870A2: Lemaguet, Yann: Method of Switching between Video Sequences and corresponding Device, 1999; and W009923560A1: LUDWIG, Lester; BROWN, William; Y U L, Inn, J.; VUONG, Anh, T., VANDERLIPPE, Richard; BURNETT, Gerald; LAUWERS, Chris; L U I, Richard; APPLEBAUM, Daniel: Scalable networked multimedia system and application, 1999.

However, none of these patents on video transcoding disclose or suggest using transcoding hints metadata information to facilitate A/V transcoding.

The Society of Motion Picture and Television ("SMPTE") proposed a standard for Television on MPEG-2 Video Recoding Data Set (327M-2000), which provides for re-encoding metadata using 256 bits for every macroblock of the source format. However, this extraction and representation of transcoding hints metadata has several disadvantages. For example, according to the proposed standard, transcoding hints metadata (such as GOP structure, quantizer settings, motion vectors, etc.) is extracted for every single frame and macroblock of the A/V source content. This method offers the advantage of offering detailed and content adaptive transcoding hints and facilitates transcoding while widely preserving The subjective A/V duality. However, the size of the transcoding hints metadata is very large. In one specific implementation of the proposed standard, 256 bits of transcoding hints metadata are stored per macroblock of MPEG video. This large amount of transcoding hints metadata is not feasible for, say, broadcast distribution to a local (e.g., home) A/V content server. Consequently, the proposed standard on transcoding hints metadata is limited to broadcast studio applications.

Another technique for transcoding hints metadata extraction and representation includes collecting general transcoding hints metadata for the transcoding of compressed A/V source content with a specific bit rate to another compressed format and bit rate. However, this technique is disadvantageous in not taking the characteristic properties of the transcoded content into account. For example, in the source content, the A/V characteristics may change from an A/V segment with limited amount of motion and few details (e.g., a news anchor scene) to another A/V segment depicting fast motion and numerous details (e.g., a sports event scene). According to this technique, misleading transcoding hints metadata, which would not suitably represent the different characteristics of both video segments, would be selected and, therefore, result in poor A/V quality and faulty bit rate allocation.

DISCLOSURE OF THE INVENTION

In view of the foregoing, it is an object of the present invention to provide a method and apparatus for extracting a compact and A/V-content adaptive multimedia description and transcoding hints metadata representation.

It is another object of the invention to provide a transcoding method and apparatus that allow for real-time execution without significant delay and inhibitive computational complexity one of the requirements for a transcoding method. A second requirement for a transcoding method is to preserve the subjective A/V quality as much as possible. To facilitate a transcoding method that fulfills both of these requirements for various compressed target formats, transcoding hints metadata may be generated in advance and stored separately or together with the compressed A/V content. It is a further object of this invention to provide a highly compact representation to reduce storage size and to facilitate distribution (e.g., broadcast to local A/V content server) of multimedia description and transcoding hints metadata.

It is, thus, an object of the invention to provide a transcoding system that: 1) preserves the A/V quality through the transcoding process, and 2) limits the computational complexity in order to enable real-time applications with minimal delay. In accordance with an embodiment of the invention, additional data (metadata) covering transcoding hints may be associated to the compressed A/V content.

Other objects and advantages of the invention will in part be obvious and will in part be apparent from the specification and the drawings.

The present invention is directed to an apparatus and method that provides automatic transcoding hints metadata extraction and compact representation.

The present invention is in the field of transcoding compressed A/V content from one compressed format into A/V content of another format by using supporting transcoding metadata. The term transcoding includes, but is not limited to changing the compressed format (e.g. conversion from MPEG-2 format to MPEG-4 format), frame-rate conversion, bit rate-conversion, session-size conversion, screen-size conversion, picture coding type conversions, etc.

The present invention may also be applied to automatic video classification using the aforementioned transcoding hints states as classes of different scene activity in video.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawing(s), in which:

FIG. 12 depicts the transcoding hints metadata for target format definition according to an embodiment of the invention;

FIG. 13 depicts the general transcoding hints metadata representation according to an embodiment of the invention;

FIG. 14 depicts the segment-based transcoding hints metadata representation according to an embodiment of the invention;

FIG. 15 depicts the encoding complexity transcoding hints metadata according to an embodiment of the invention; and FIG. 16 depicts the transcoding hints state metadata according to an embodiment of the invention.

BEST MODE FOR CARRYING OUT THE INVENTION

Figure 1:
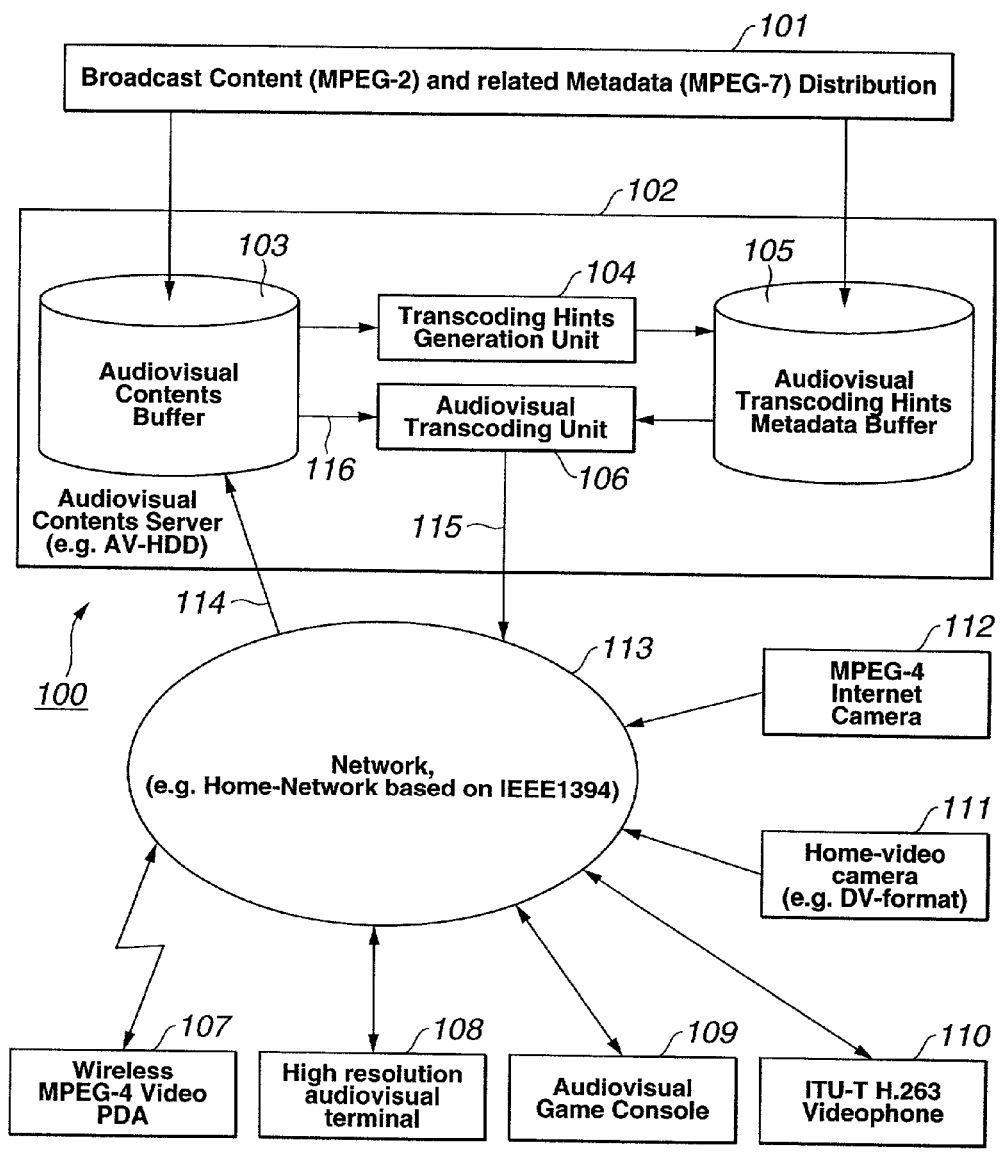
FIG. 1 depicts a system overview of a transcoding system in a home network with various A/V terminals in accordance with an embodiment of the invention.

FIG. 1 depicts a general overview on a system 100 for transcoding in a home network environment in accordance with an embodiment of the invention. As shown in FIG. 1, an A/V content server 102 includes an A/V content storage 103, an A/V transcoding unit 106, a transcoding hints metadata extraction unit 104, and an A/V transcoding hints metadata storage buffer 105. A/V content storage 103 stores compressed A/V material from various sources with varying bit rate and varying subjective quality. For example, A/V content storage 103 may contain home video from a portable Digital Video ("DV") video camera 111, MPEG-4 compressed video with a very low bit rates (of say 10 kbit/s) from an MPEG-4 Internet camera 112, and MPEG-2 Main Profile at Main Level ("MP@ML") compressed broadcast video of around 5 Mbit/s from a broadcast service 101, which is in some cases already associated with transcoding hints metadata. A/V content server 102 may also contain high definition compressed MPEG video at considerably higher bit rates.

As shown in FIG. 1, A/V content server 102 is connected to a network 113, which may be a wire-based or wireless home network. Several A/V terminals with different characteristics may also be attached to network 113, including, but not limited to: a wireless MPEG-4 A/V personal digital assistant ("PDA") 107, a high resolution A/V terminal for high definition television entertainment 108, an A/V game console 109, and an International Telecommunications Union Technical Standards Group ("ITU-T") based videophone 110. The A/V terminals 107, 108, 109, and 110 may be attached with different bit rate transmission capabilities (due to cable or radio link) to home network 113.

Furthermore, wireless video PDA 107, for example, may be limited in terms of computational power, storage memory, screen size, video frame rate, and network bit rate. Therefore, A/V transcoding unit 106 may transcode, for example, 5 Mbit/s MPEG-2 broadcast video at European 25 frames per second ("fps") and 720×480 pel contained in A/V content server 102 to an MPEG-4 500 kbit/s 15 fps video for wireless transmission and display on a 352×240 pel display by wireless MPEG-4 video PDA 107. A/V transcoding unit 106 may use the transcoding hints metadata from buffer 105 to transcode, in real time, the compressed source bit rate of the A/V content to the capabilities of each specific target A/V terminal 107, 108, 109, and 110. The transcoding hints metadata are generated in transcoding hints metadata extraction unit 104 or they may be distributed by a broadcast service 101.

As shown in FIG. 1, a compressed bitstream in a source format (hereinafter "first bitstream") 116 is transferred from A/V content buffer 103 to A/V transcoding unit 106. A bitstream in a target format (hereinafter "second bitstream") 115 is transferred after transcoding in transcoding unit 106 to home network 113. From home network 113, content in, e.g., compressed DV format is stored in A/V content storage 103 via link 114.

Figure 2:
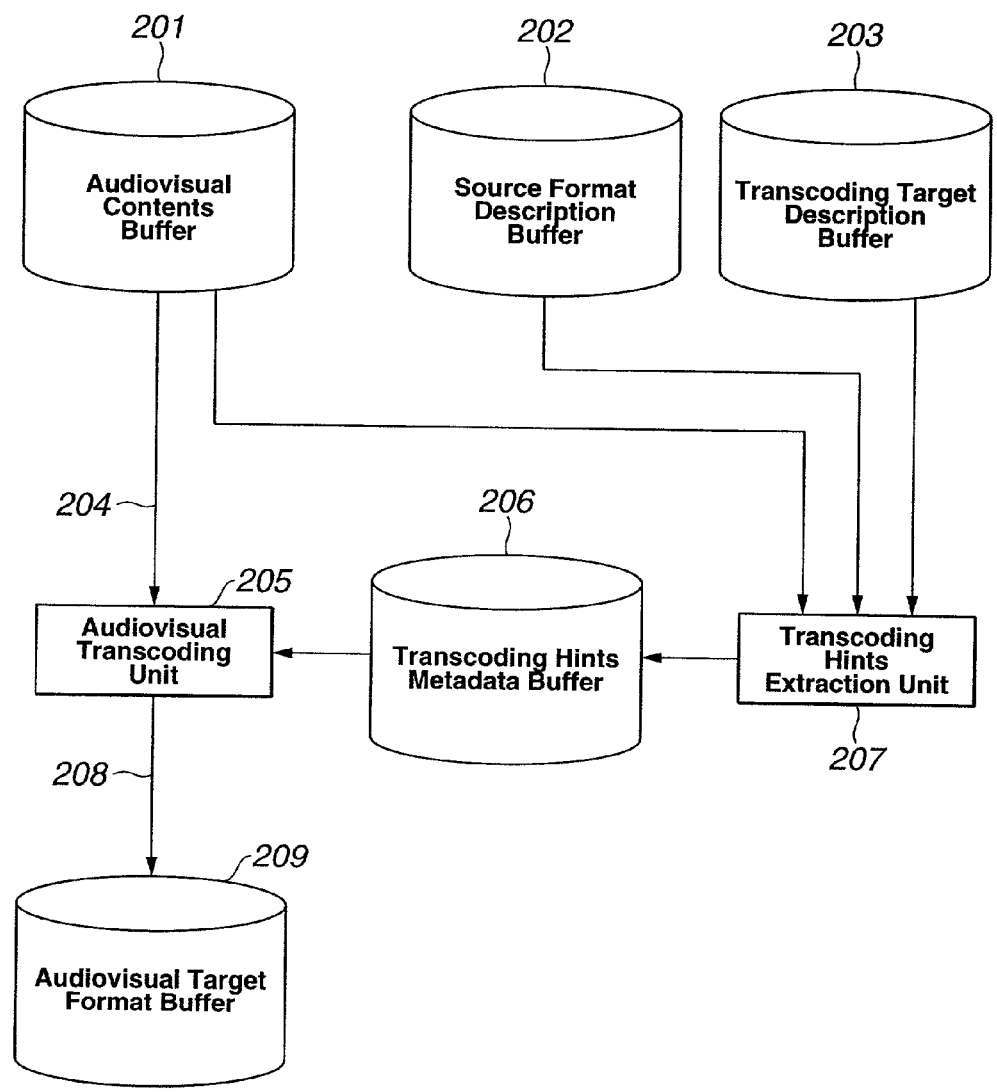
FIG. 2 illustrates the transcoding hints extraction (Group of Pictures, "GOP") in accordance with an embodiment of the invention.

FIG. 2 illustrates the transcoding hints extraction, transcoding hints storage, and transcoding process in accordance with an embodiment of the invention. As shown in FIG. 2, a buffer 201 contains A/V content in a source format. A buffer 202 contains a description of the source format, such as bit rate, compression method, GOP structure, screen size, interlaced or progressive format, etc. A buffer 203 contains a description of a target format, such as bit rate, compression method, GOP structure, screen size, interlaced or progressive format, etc. A transcoding hints extraction unit 207 reads the A/V content in compressed source format from A/V buffer 201, as well as the source format description from buffer 202 and the transcoding target format description from buffer 203. After the transcoding hints are calculated by transcoding hints extraction unit 207, the transcoding hints are stored in a transcoding hints metadata buffer 206. An A/V transcoding unit 205 reads first bitstream 204 in the source format from A/V content buffer 201 and transforms the source format into the target format by means of the transcoding hints metadata stored in buffer 206. A/V transcoding unit 205 outputs second bitstream 208 in the new compressed target format to an A/V target format buffer 209 for storage.

Figure 3:
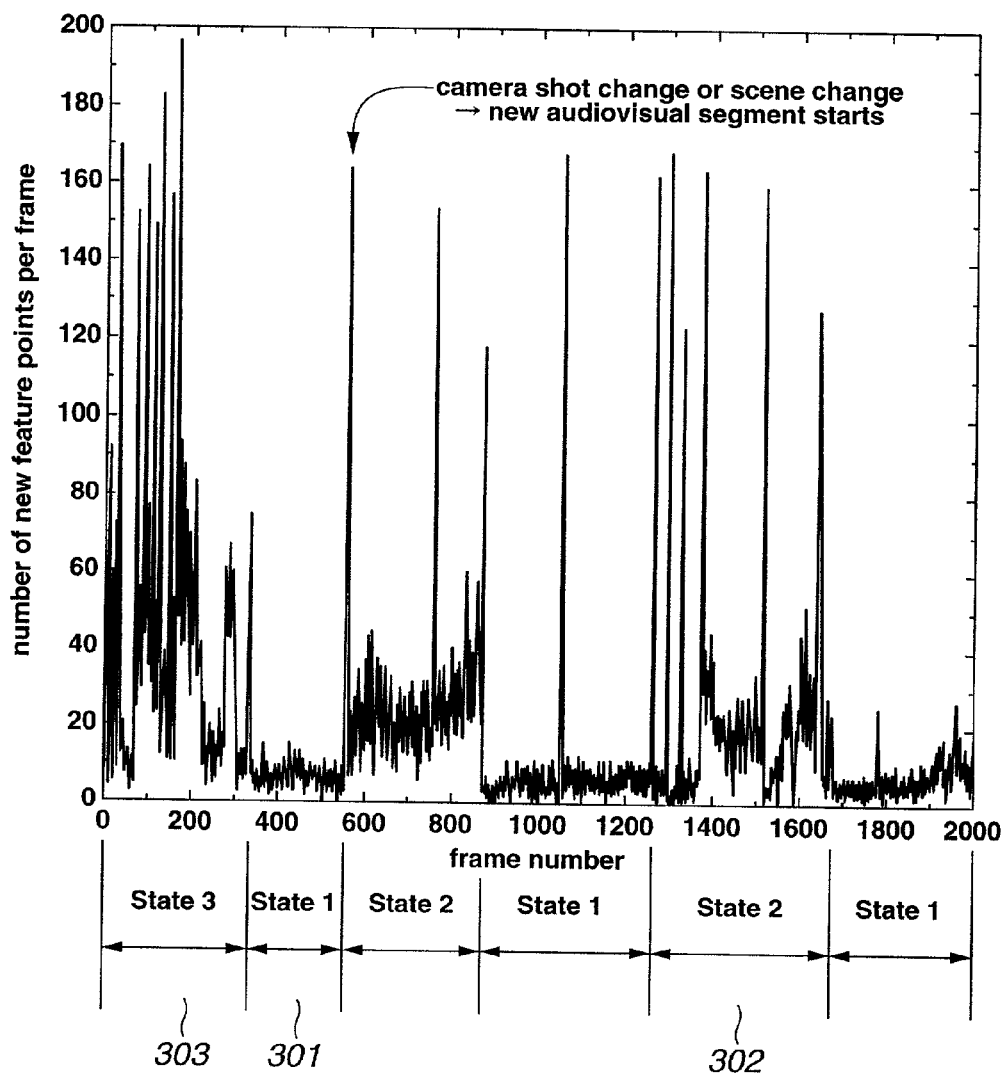
FIG. 3 illustrates an example for the selection of transcoding states depending on the number of new feature points per frame according to an embodiment of the invention.
Figure 4:
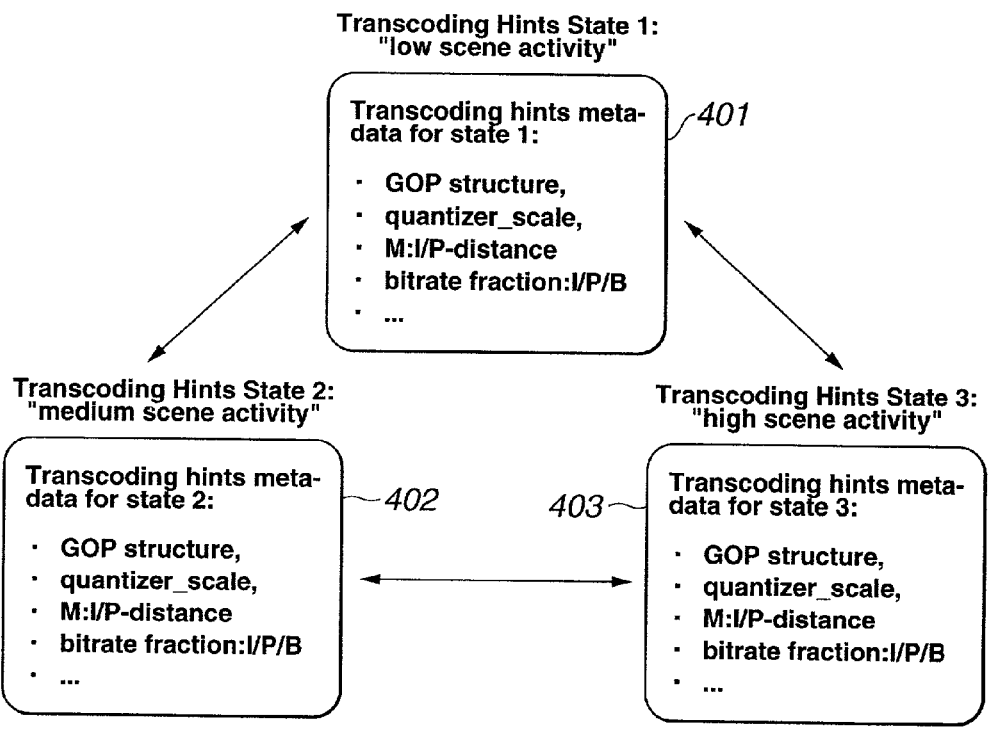
FIG. 4 shows an example of a transcoding hints state diagram with 3 states according to an embodiment of the invention.

FIGS. 3 and 4 illustrate the principle of transcoding hints metadata organization in accordance with an embodiment of the invention. MPEG-based video compression uses a predictable method, where changes between successive frames are encoded. Video content with a large number of changes from one frame to the next frame requires (for maintaining the subjective quality while limiting the bit rate) different re-encoding parameter settings, than video content with small changes between frames. Therefore, it is important to decide in advance on the re-encoding parameters. The transcoding hints metadata-selection mainly depends on amount and characteristics of unpredictable visual content. The new visual content may not be predicted from previous frames and may be bit rate intensive encoded using DCT-coefficients. As such, the inventive method uses the number of new feature points, which are not tracked from a previous frame to a current frame to determine the amount of new content per frame.

FIG. 3 depicts a graph of the number of new feature points per frame depending on the frame number of a video (horizontal axis, time axis). Section 301 is a part of a video segment where only a very small amount of new content appears between succeeding frames, and therefore respective transcoding hints metadata (e.g., large GOP size, low frame rate, low bit rate, . . . ) may be chosen. Section 302 includes a slightly higher number of new feature points per frame, which means that a state describing transcoding hints metadata is chosen, which provides optimum transcoding parameters for this situation (e.g., slightly smaller GOP size, higher bit rate). Section 303 depicts a transcoding metadata hints state with a high number of new feature points per frame, and therefore a high amount of new content per scene. As such, a smaller M value (I/P-frame distance) and a higher bit rate are chosen.

FIG. 4 depicts an example of the basic organization of a transcoding hints metadata state diagram consisting of three discrete transcoding hints metadata states. Every discrete transcoding state may contain metadata for GOP structure, quantizer parameters, bit rate, screen size, etc. These transcoding hint parameters may have a fixed value or may be a function of another parameter. For example, the GOP length may be a discrete function of the number of new feature points per frame and the quantizer parameters may be a function of the edge and texture activity derived from the DCT coefficients. Each of the three transcoding hints metadata states in this example may be selected to accommodate three different encoding situations. As shown in FIG. 4, state "3" 403 is selected for a high amount of motion and low amount of new content per frame and represents the optimum state for transcoding hints metadata for such content. State "2" 402 is selected for low amount of motion and high amount of content with high edge activity, which may require a high number of bits to be spent. State "1" 401 is, for example, selected to accommodate the transcoding process for A/V content with low scene activity. There are also other special transcoding hint metadata states provided for video editing effects, like different crossfading effects, abrupt scene changes, or black pictures between two scenes. The location of the video editing effects may be detected manually, semi-automatically, or fully automatically.

Figure 5:
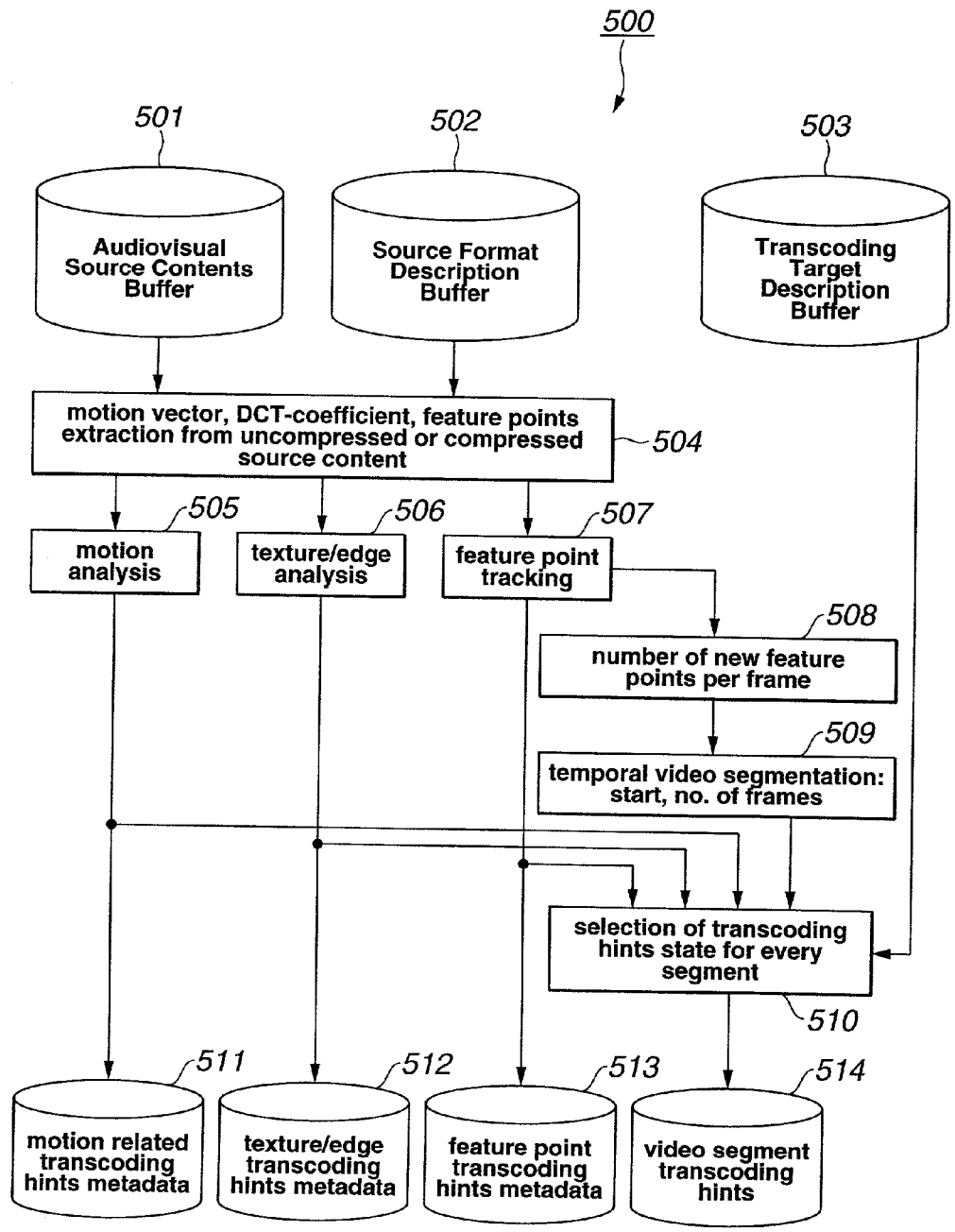
FIG. 5 illustrates the transcoding hints metadata extraction from compressed and uncompressed source content in accordance with an embodiment of the invention.

FIG. 5 illustrates the transcoding hints metadata extraction from compressed and uncompressed source content in accordance with an embodiment of the invention. As shown in FIG. 5, a system 500 includes an A/V source content buffer 501, a source format description buffer 502, and a target format description buffer 503.

A memory 504 is included for storing the motion vector, DCT-coefficient, and feature point extraction from compressed or uncompressed domains. In the compressed domain, motion vector from P- and B-macroblocks may be directly extracted from a bitstream. However, there are no motion vectors, for Intra-macroblocks. Therefore, the motion vectors obtained for B- and P-macroblocks may be interpolated for I-macroblocks (see Roy Wang, Thomas Huang: "Fast Camera motion Analysis in MPEG domain", IEEE International Conference on Image Processing, ICIP 99, Kobe, Japan, October 1999). DCT coefficients for blocks of Intra-macroblocks may be directly extracted from a bitstream. For P- and B-macroblocks, a limited number of DCT-coefficients (DC and 2 AC coefficients) may be obtained by the method described by Shih-Fu Chang, David G. Messerschmid: "Manipulation and Composition of MC-DCT compressed video", IEEE Journal on Selected Areas in Communications, vol. 8, 1996. Exemplary methods of compressed domain feature point extraction and motion estimation is disclosed in the patent by Peter Kuhn: "Method and Apparatus for compressed domain feature point registration and motion estimation", PCT patent, December 1999, which is incorporated herein by reference. In some cases, the A/V source content may only be available in uncompressed format or in a compression format that is not based on the DCT and motion compensation principle, which is employed by MPEG-1, MPEG-2, MPEG-4, ITU-T.H.261, and ITU-T H.263. For the DV format, it may be the case that only the DCT-coefficients are available. In these cases motion vectors may be obtained by motion estimation methods, cf. e.g. Peter Kuhn. "Algorithms, Complexity Analysis and VLSI Architectures for MPEG-4 Motion Estimation", Kluwer Academic A Publishers, 1999. DCT-coefficients may be obtained by performing a block-based DCT-transform, cf. K. R. Rao, P. Yip: "Discrete Cosine Transform—Algorithms, Advantages, Applications", Academic Press 1990. Feature points in pel domain (uncompressed domain) may be obtained for example by the method described by Bruce D. Lucas, Takeo Kanade: "An iterative registration technique with an application to stereo vision", International Joint Conference on Artificial Intelligence, pp. 674-679, 1981.

A motion analysis part 505 extracts the parameters of a parametric motion model from the motion vector representation in memory 504. Parametric motion models may have 6 and 8 parameters and parametric motion estimation may be obtained by methods described in M. Tekalp: "Digital Video Processing", Prentice Hall, 1995. The goal of using a motion representation is to eliminate the motion estimation in the transcoder for delay and speed reasons. Therefore, the input representation of motion from the source bitstream may be used to derive the output representation (target bitstream). For example, screen-size resizing, interlaced-progressive conversion, etc., may rely heavily on the motion representation. The parameters of the motion representation may also be used for coding decisions on GOP structure. A texture/edge analysis part 506 may be based on the DCT-coefficients extracted from the bitstream, e.g., K. R. Rao, P Yip: "Discrete Cosine Transform—Algorithms, Advantages, Applications", Academic Press 1990, or K. W. Chun, K. W. Lim, H. D. Cho, J. B. Ra: "An adaptive perceptual quantization algorithm for video encoding, IEEE Transactions on Consumer Electronics, Vol. 39, No. 3, August 1993.

A feature point tracking part 507 for the compressed domain may employ a technique described in Peter Kuhn. "Method and Apparatus for compressed domain feature point registration and motion estimation", PCT patent, December 1999, which is incorporated herein by reference. A processor 510 calculates the number of new feature points per frame. A processor 509 calculates the temporal video segmentation, and a processor 510 calculates the transcoding hints state for every segment. Methods for these calculations according to an embodiment of the invention will be described in detail below with reference to FIG. 6, FIG. 7, and FIG. 8.

A memory 511 contains the motion-related transcoding hints metadata. A memory 512 contains the texture/edge related transcoding hints metadata, and a memory 513 contains the feature point transcoding hints metadata, all of which will be described in detail below with reference to FIG. 15. A memory 514 contains video segment transcoding hints selection metadata, which will be described with reference to FIG. 16. The automatic extraction, compact representation, and usage of the transcoding hints metadata will now be described.

Figure 6:
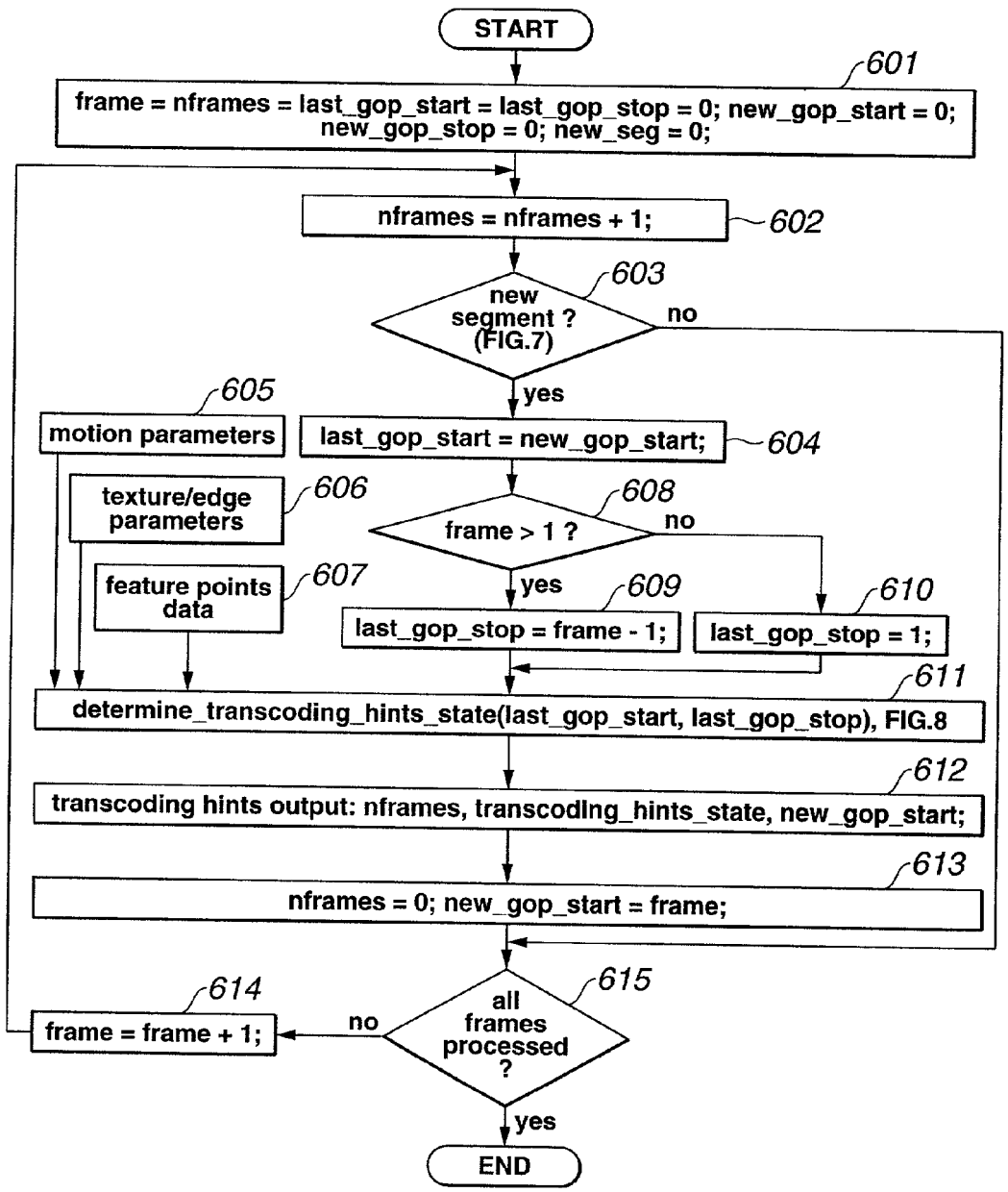
FIG. 6 shows a video segmentation and transcoding hints state selection process in accordance with an embodiment of the invention.

FIG. 6 discloses a video segmentation and transcoding hints state selection process in accordance with an embodiment of the invention. At step 601, some variables are initialized. The variable "frame" is the current frame number of the source bitstream, and "nframes" is the number of frames within the new video segment (or GOP, group of pictures). The other variables are only of use within this routine. At step 602, the number of frames within the GOP is incremented. At step 603, it is determined whether a new segment/GOP starts within the frame, details of which will be discussed in detail with reference to FIG. 7. If so ("yes"), control is passed to step 604, otherwise, it is passed to step 615. At step 604, the variable "last_gop_start" is initialized with the value of "new_gop_start". At steps 608 and 609, the variable "last_gop_stop" is set to "frame-1" if the variable "frame" is larger than 1. Otherwise, at step 610, "last_gop_stop" is set to 1. Next, at step 611, which is depicted in detail in FIG. 8, determines the transcoding hints state based on motion parameters 605, texture/edge parameters 606, and feature-point data 607. At step 612, the transcoding hints metadata are output to the transcoding hints metadata buffers. In accordance with an embodiment of the invention, the transcoding hints metadata comprises "nframes" (number of frames within the GOP), the transcoding hints state with all the parameters, and the start frame number of the new GOP ("new_gop_start"). After that, the variable "nframes" is set to 0 and the current frame number "frame" is given to the variable "new_gop_start". Then, at step 615, it is tested to determine if all frames of the source bitstream have been processed. If not ("no"), control is passed to step 614 where the frame number is incremented and the process is repeated starting from step 602. Otherwise, the process is terminated.

Figure 7:
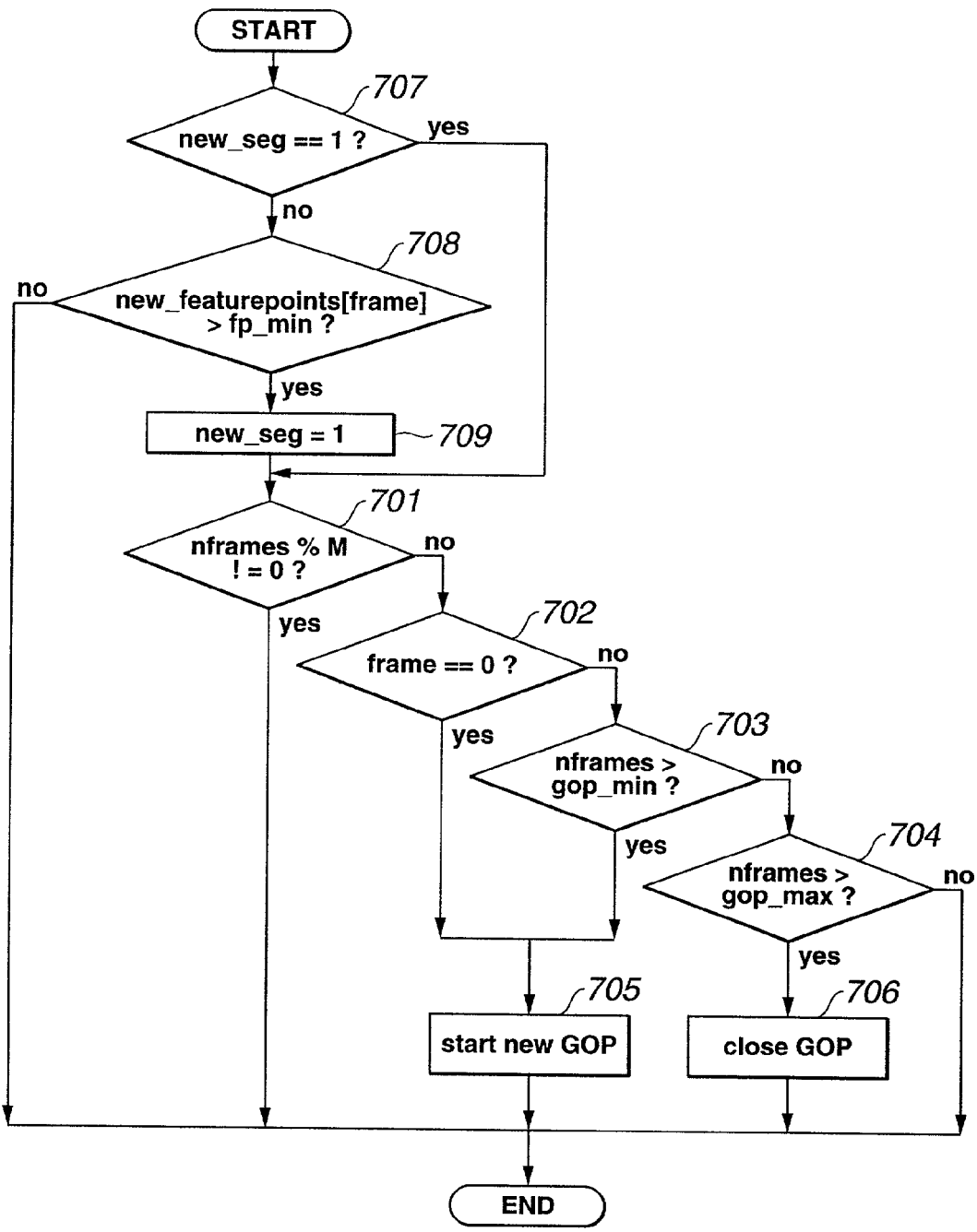
FIG. 7 shows a method of determining the boundaries of a new video segment (or new GOP) in accordance with an embodiment of the invention.

FIG. 7 illustrates a method for determining the start frame and the end frame of a new video segment or GOP according to an embodiment of the invention. At step 701, it is determined whether the variable "nframes" from FIG. 6 is an integer multiple of M (which is the I/P frame distance). If so, then "no" is selected and at step 702, it is determined whether the current frame number is the first frame. If so ("no"), control is passed to step 703 where it is determined whether "nframes" is greater than a minimum number of frames "gop_min" within a GOP. In case the result at step 702 is "yes", a new GOP is started at step 705. In case the result at step 703 is "yes", a new GOP is started at step 705. In case the result at step 703 is "no", control is passed to step 704 where it is determined whether "nframes" is greater than a maximum number of frames "gop_max" within a GOP. In case the result at step 704 is "yes", the GOP is closed at step 706, otherwise, the process is terminated.

Figure 8:
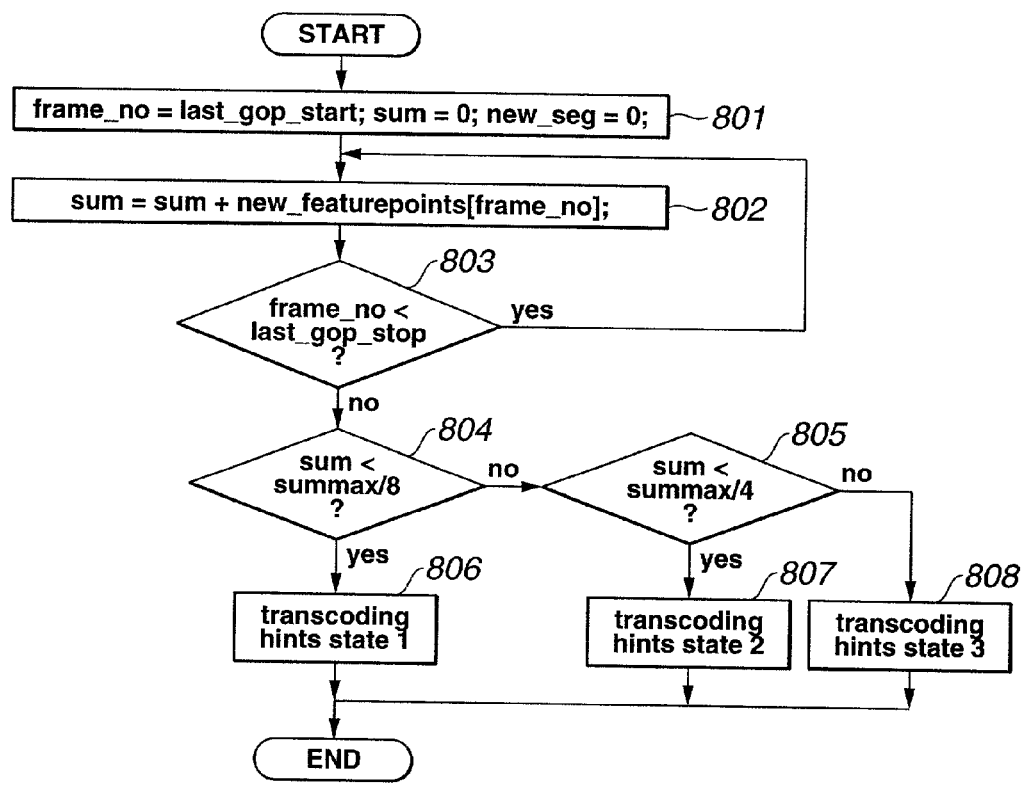
FIG. 8 shows an algorithm on how to select the transcoding hints state in accordance with an embodiment of the invention.

FIG. 8 illustrates a process for selecting a transcoding hint state for a specific GOP or A/V segment taking only the number of new feature points per frame into account in accordance with an embodiment of the invention. Based on the basic idea illustrated, similar decision structures may be implemented using the aforementioned motion parameters from a parametric motion estimation as well as texture/edge parameters gained from DCT-coefficients. It is noted that the class or algorithms described may also be used to classify A/V material in terms of motion, edge activity, new content per frame, etc., leading to a higher level of A/V classification. In such cases, the transcoding hint states would represent specific classes of different content material. Referring now to FIG. 8, at step 801, variables "frame_no", "last_gop_start", "sum" and "new_seg" are initialized. The variable "frame no" is given the contents of the "last_gop_start" parameter, and the variables "sum" and "new_seg" are initialized with zero. Then, at step 802, the contents of the variable "sum" is incremented by the number of new feature points of the current frame ("frame_no"). At step 803, it is determined whether the variable "frame_no" is less than the variable "last_gop_stop". If so ("yes"), step 802 is repeated, otherwise, control is passed to step 804. At step 804, it is determined whether the value of the variable "sum" is less than one-eight of a predetermined parameter "summax". The parameter "summax" is a constant that represents the maximum number of feature points that can be tracked from frame to frame multiplied by the number of frames between the frames "last_gop_start" and "last_gop_stop". It may have the value 200 according to an embodiment of the invention. If the result at step 804 is "yes", the transcoding hints state 1 is selected at step 806 for which the parameters are shown in Table 1 of FIG. 8. Otherwise, at step 805, it is determined whether the value of the variable "sum" is less than one-quarter of the predetermined parameter "summax". If so ("yes"), the transcoding hints state 2, as shown in Table 1 is selected at step 807. If not ("no"), the transcoding hints state 3 (as shown in Table 1) is selected at step 808 and the process is terminated. It is noted that the decision thresholds in steps 804 and 805 depend on the definition and number of transcoding hints states.

Transcoding Hints Metadata Description

For metadata explanation, a pseudo C-code style may be used. Abbreviations D for Description and DS for Description Schemes, as defined in the emerging MPEG-7 metadata standard, may be used.

Figure 9:
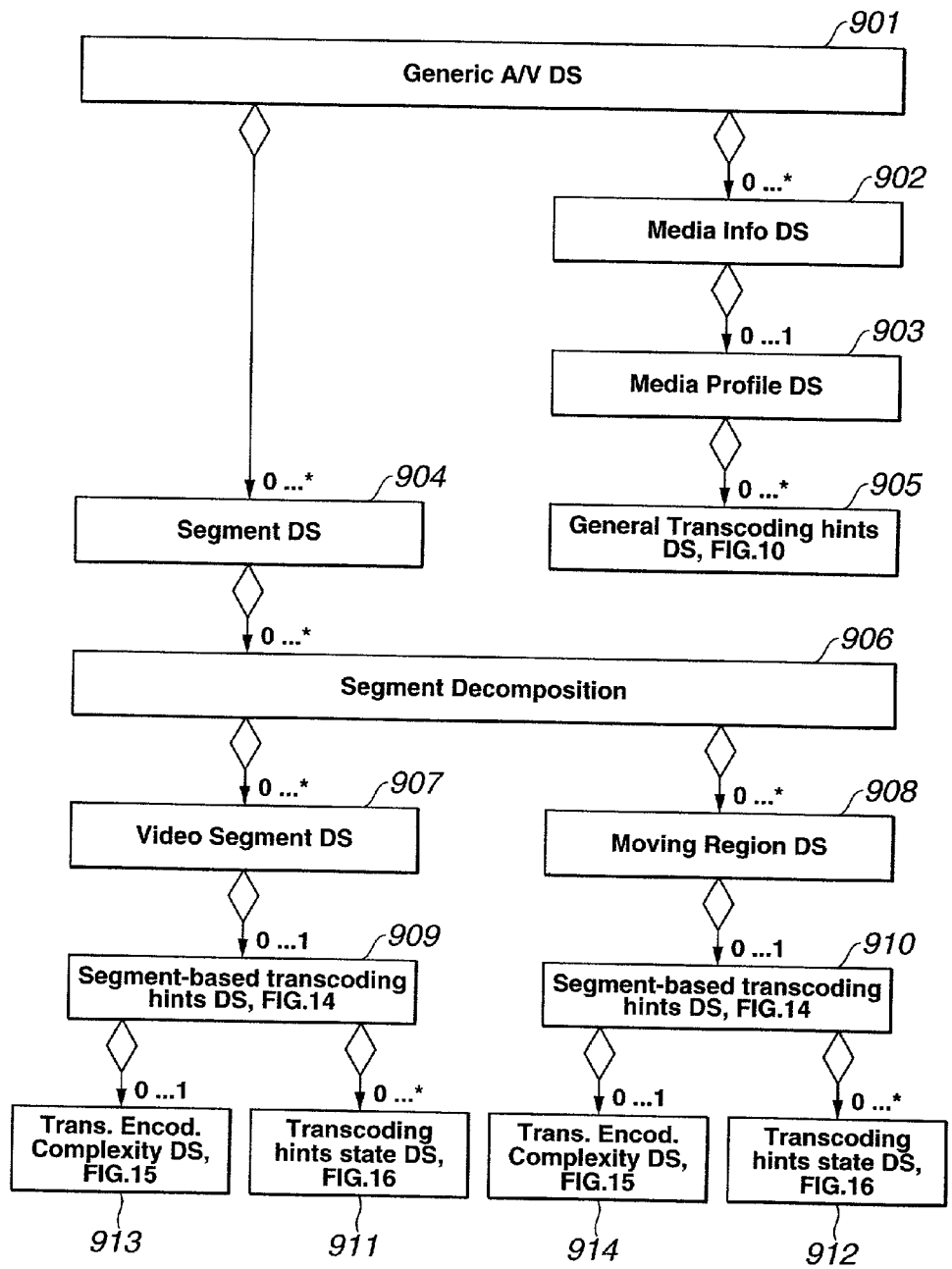
FIG. 9 provides an overview of a structural organization of transcoding hints metadata in accordance with an embodiment of the invention.

FIG. 9 depicts a structural organization of transcoding hints metadata within a Generic A/V DS 901 in accordance with an embodiment of the invention. As shown in FIG. 9, Segment DS 904 and Media Info DS 902 are derived from Generic A/V DS 901. Segment Decomposition 906 is derived from Segment DS 904, and Video Segment DS 907 and Moving Region DS 907 are derived from Segment Decomposition 906. Segment-based transcoding hints DS 909, which will be described in detail with reference to FIG. 14, is derived from Video Segment DS 907. Video Segment DS 907 accesses one or several transcoding hint state DS 911, which will be described in detail with reference to FIG. 16. From Moving Region DS 908, the Segment-based transcoding hints DS 910, which will be described in detail with reference to FIG. 14, for moving regions is derived, which accesses one or several transcoding hint state DS 912, which will be described in detail with reference to FIG. 16. From Media Info DS 902, Media Profile DS 903 is derived. From Media Profile DS 903, General Transcoding Hints DS 905, which will be described with reference to FIG. 10, is derived.

Figures 10, 11:
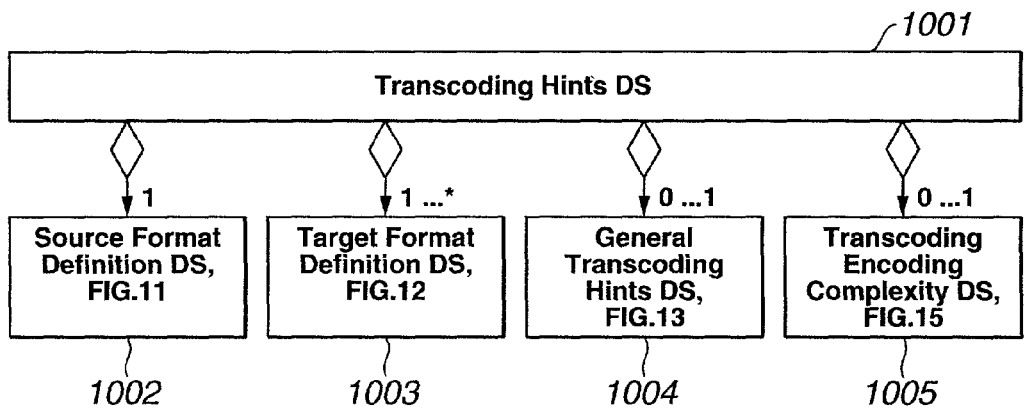
FIG. 10 depicts a structural organization of a general transcoding hints metadata description scheme according to an embodiment of the invention.
FIG. 11 depicts the transcoding hints metadata for source format definition according to an embodiment of the invention.

FIG. 10 depicts the structural organization of Transcoding Hints DS 1001, which consists of one instance of the Source Format Definition DS 1002, which will be described with reference to FIG. 11, one or several instances of target format definition DS 1003 which will be described with reference to FIG. 12. Additionally, Transcoding Hints DS 1001 consists of one optional instance of General Transcoding Hints DS 1004, which will be described with reference to FIG. 13, and one optional Transcoding all Encoding Complexity DS 1005, which will be described with reference to FIG. 15.

FIG. 11 depicts source format definition transcoding hints metadata (e.g., Source Format Definition DS 1002 in FIG. 10) which is associated to the whole A/V content or to a specific A/V segment, in accordance with an embodiment of the invention. As shown in FIG. 11, relevant Descriptors and Description Schemes may include:

bitrate is of type <int> and describes the bit rate per second of the source A/V data stream.

size_of_pictures is of type <2*int> and describes the size of picture of the source A/V format in x and y directions.

number_of_frames_per_second is of type <int> and describes the number of frames per second of the source content.

pel_aspect_ratio is of type <float> and describes the pel aspect ratio.

pel_colour_depth is of type <int> and describes the color depth.

usage_of_progressive_interlaced_format is of size <1 bit> and describes whether the source format is in progressive or in interlaced format.

usage_of_frame_field_pictures is of size <1 bit> and describes whether frame or field pictures are used.

compression method is of type <int> and defines the compression method used for the source format and may be selected from a list that includes: MPEG-1, MPEG-2, MPEG-4, DV, H.263, H,261, etc. For every compression method, further parameters may be defined here.

GOP_structure is a run-length-encoded data field of the I, P, B-states. For example, in case there are only I-frames in an MPEG-2 video, direct conversion to the DV format in compressed domain is possible.

FIG. 12 depicts target format definition transcoding hints metadata, which may be associated to the whole A/V content or to a specific A/V segment, in accordance with an embodiment of the invention. As shown in FIG. 12, the relevant Descriptors and Description Schemes may include:

bitrate is of type <int> and describes the bit rate per second of the target A/V data stream.

size_of_pictures is of type <2*int> and describes the size of picture of the target A/V format in x and y directions.

number_of_frames_per_second is of type <int> and describes the number of frames per second of the target content.

pel_aspect_ratio is of type <float> and describes the pel aspect ratio.

pel_colour_depth is of type <int> and describes the color depth.

usage_of_progressive_interlaced_format is of size <1 bit> and describes whether the target format needs to be progressive or interlaced.

usage_of_frame_field_pictures is of size <1 bit> and describes whether frame or field pictures are used.

compression_method is of type <int> and defines the compression method used for the target format and may be selected from a list that includes: MPEG-1, MPEG-2, MPEG-4, DV, H.263, H.261, etc. For every compression method, further parameters may be defined here.

GOP_structure is an optional run-length-encoded data field of the I, P, B-states. With this optional parameter, a fixed GOP structure may be forced. A Fixed GOP structure may be useful, for example, to force I-frames at certain locations to facilitate video editing.

FIG. 13 depicts general transcoding hints metadata (e.g., General Transcoding Hints DS 1004 in FIG. 11), which may be associated to the whole A/V content or to a specific A/V segment, according to an embodiment of the invention. As shown in FIG. 13, relevant Descriptors and Description Schemes may include:

use_region_of_interest_DS has a length of <1 bit> and indicates whether a region of interest description scheme is available as transcoding hints.

In case the region_of_interest_DS is used, then a shape_D (which may be for example one of the following: boundary_box_D, MB_shape_D, or any other shape_D) together with a motion_trajectory_D may be used to spatially and temporally describe the region of interest. An MB_shape_D may use macroblock (16×16) sized blocks for object shape description. Motion_trajectory_D already includes a notion of time so that the start frame and the end frame of the region_of_interest_DS may be defined. The region_of_interest_DS may have the size of the respective shape_D and the respective motion_trajectory_D. For transcoding applications, the region_of_interest_DS may be used, for example, to spend more bits (or modify the quantizer, respectively) for the blocks within the region of interest than for the background. Another transcoding application to MPEG-4 may be to describe the region of interest by a separate MPEG-4 object and to spent a higher bit rate and a higher frame rate for the region of interest than for other MPEG-4 objects like the background. The extraction of the region_of_interest_DS may be performed automatically or manually.

use_editing_effects_transcoding_hints_DS has a length of <1 bit> and indicates if information is available on editing-effects-based transcoding hints.

camera_flash is a list of entries where every entry describes the frame number where a camera flash occurs. Therefore, the length of the descriptor is the number of camera flash events multiplied by <int>. For transcoding applications, the camera_flash descriptor is very useful, as most of the video (re-) encoders/transcoders use a motion estimation method based on the luminance difference, c.f. Peter Kuhn: "Algorithms, Complexity Analysis and VLSI Architectures for MPEG-4 motion estimation", Kluwer Academic publishers, 1999. In case of a luminance-based motion estimation, the mean absolute error between two macroblocks of two subsequent frames (one with flash, one without flash) would be too high for prediction and the frame with the camera flash would have to be encoded as Intra-frame with high bit rate costs. Therefore, indicating the camera flash within a transcoding hints Description Scheme ("DS"), allows for using, for example, a luminance corrected motion estimation method or other means to predict the frame with the camera flash from the anchor frame(s) with moderate bit costs.

cross_fading is a list of entries where every entry describes the start frame and the end frame of a cross fading. Therefore, the length of this descriptor is two times <int> of the number of cross fading events. Indicating the cross fading events in transcoding hints metadata is very useful for controlling the bit rate/quantizer during the cross fading. During cross fading, prediction is generally of limited use causing a bit rate increase for prediction error coding. As during cross fading, the scene is usually blurred, the bit rate increase may be limited by adjusting the quantizer scale, bit rate, or rate control parameters, respectively.

black_pictures is a list of entries where every entry describes the start frame and the end frame of a sequence of black pictures. Between scenes, especially in home video, black pictures may occur. Experimentally, results indicate that a series of black pictures increases the bit rate in motion-compensated DCT coders because the prediction is only of limited use. Therefore, this transcoding hints descriptor may be used to limit the bit rate during black pictures by adjusting the quantizer scale, bit rate, or rate control parameters, respectively.

fade_in is similar to cross_fading, and is described as a number of entries determining the start frame and the end frame of a fade in. In comparison to cross fading, the fade in starts from black pictures, and, therefore, a kind of masking effect of the eye may be used to limit the bit rate during fade in by adjusting the quantizer_scale, bit rate, or rate control parameters, respectively.

fade_out is similar to fade_in, except that after a scene, a series of black pictures are described.

abrupt_change is described by a list of single frame numbers of type <int> indicating where abrupt scene or shot changes without fading appear. These events are indicated, for example, by the very high and sharp peaks in FIG. 3. These peaks indicate the beginning of a new camera shot or scene. The abrupt_change editing effect is in contrast to the fading effects. When abrupt changes between two video segments appear, then the human visual perception needs a few milliseconds to adapt and recognize the details of the new A/V segment. This slowness effect of the human eye may be used beneficially for video transcoding, for example, for reducing the bit rate or modifying the quantizer scale parameters for the first frames of a video segment after an abrupt change of a scene or shot.

use_motion_transcoding_hints_DS has a length of <1 bit> and indicates the use of motion-related transcoding hints metadata.

number of regions indicates the number of regions for which the following motion-related transcoding hints metadata are valid.

for_every_region is indicated by a field of <1 bit> length, whether the region is rectangular or arbitrarily-shaped. In case the region is arbitrarily-shaped, a region descriptor (consisting, e.g., of a shape descriptor and a motion trajectory descriptor) is used. In case of a rectangular region, the size of the rectangular region is used. The motion field within this region is described by a parametric motion model, which is determined by several parameters for every frame or sequence of frames. For transcoding, this motion representation of the real motion of the source video may be used to limit the search area of the computational complex motion estimation of the (re-) encoding part, and also for fast and efficient interlaced/de-interlaced (frame/field) conversion and determining the GOP (Group of Pictures) structure depending on the amount of motion within the video. The motion representation may also be used beneficially for size conversion of the video.

FIG. 14 depicts the segment-based transcoding hints metadata (e.g., segment-based transcoding hints DS 909 and 910 in FIG. 9) which may be used to determine the (re-) encoder/transcoder settings for an A/V segment which depicts constant characteristics, in accordance with an embodiment of the invention. As shown in FIG. 14, relevant Descriptors and Description Schemes may include:

start_frame is of type <int> and describes the frame number of the beginning of the transcoding hints metadata of an A/V segment.

nframes is of type <int> and describes the length of an A/V segment.

I_frame_location gives several possibilities for describing the location of I-frames within an A/V segment.

select_one_out_of_the_following is of size <2 bit> and selects one of the following four I-frame location description methods.

first frame is of size <1 bit> and is the default I-frame location. This method describes an A/V segment where only the first frame is an Intra frame of the A/V segment and is used as an anchor for further prediction and all other frames within the A/N segment are P- or B-frames.

List of frames gives a list of frame numbers of Intra-frames within an A/V segment. This method allows for arbitrarily describing the location of Intra-frames within an A/V segment. For k frames within this list, the size of this descriptor is <k*int>.

first_frame_and_every_k_frames is of type <int>, where the first frame within a segment is Intra and k describes the interval of I-frames within the A/V segment.

no_I_frame is of size <1 bit> and describes the case where no I-frame is used within an A/V segment, which is useful when the encoding of the A/V segment is based on an anchor (Intra-frame) in a previous segment.

quantizer_scale is of type <int> and describes the initial quantizer scale value for an A/V segment.

target_bitrate is of type <int> and describes the target bit rate per second for an A/V segment.

target_min_bitrate is of size <int> and describes the minimum target bit rate per second for an A/V segment (optional).

target_max_bitrate is of size <int> and describes the maximum target bit rate per second for an A/V segment (optional).

use_transcoding_states is of size <1 bit> and describes whether transcoding hint states are used for an A/V segment.

transcoding_state_nr is of type <int> and gives the transcoding hint metadata state for a segment. The transcoding hint metadata state is a pointer to an entry in a table of transcoding hint states. The table of transcoding hint states may have several entries, where new entries may be added or deleted by transcoding hints parameters. The transcoding hints metadata of a single transcoding hint state will be described with reference to FIG. 16.

add_new_transcoding_state is of size <1 bit> and describes whether a new transcoding state with associated information has to be added to the transcoding hints table. In case the add_new_transcoding_state signals "yes", a list of parameters of the new transcoding hints state is given. The size of the parameter list is determined by the number of parameters of one transcoding hints state and the number of transcoding hints state.

remove_transcoding_state is a flag of size <1 bit> indicating whether a transcoding state may be removed or not. In case a transcoding state may be removed, the state number (type: <int>) of the transcoding state to be removed is given.

use_encoding_complexity_description is of size <1 bit> and signals whether a more detailed encoding complexity description scheme as defined in FIG. 15 has to be used.

FIG. 15 depicts the coding complexity transcoding hints metadata, which may be associated to the whole A/V content or to a specific A/V segment, according to an embodiment of the invention. Encoding complexity metadata may be used for rate control and determines the quantizer and bit rate settings.

use_feature_points is of size <1 bit> and indicates the use of feature point based complexity estimation data.

select_feature_point_method is of size <2 bits> and selects the feature point method.

number_of_new_feature_points per frame describes a list of the number of new feature points per frame as indicated in FIG. 3, and which are of size <nframes*int>. This metric indicates the amount of new content per frame.

feature_point_metrics describes a list of metrics based on the new feature points per frame within one segment. The metrics are represented as an ordered list of <int> values with the following meaning: mean, max, min, variance, standard deviation of the number of the new feature points per frame.

use_equation_description is an <int> pointer to an equation-based description of the encoding complexity per frame.

use_motion_description is of size <1 bit> and indicates the use of a motion-based complexity description.

select_motion_method is of size <4 bits> and selects the motion description method.

param_k_motion is of size <nframes*k*int> and describes the k parameters for every single frame of a global parametric motion model.

motion_metrics describes a list of metrics for the whole segment-based on the size of the motion vectors. The metrics are represented as an ordered list of <int> values with the following meaning: mean, max, min, var, std-dev of the macroblock motion vectors.

block_motion_field describes every vector of an m*m block sized motion field and is of size <nframes*int*size_x*size_y/(m*m)>.

use_texture_edge_metrics is a flag that is set when texture or edge metrics are used and it is of size <1 bit>.

select_texture_edge_metrics is of size <4 bits> and it determines which texture metric from the following is used.

DCT_block_energy is the sum of all DCT-coefficients of one block and is defined for every block within a frame. It is of size <size_y*size-X*nframes*int/64>.

DCT_block_activity is defined as the sum of all DCT-coefficients of one block but without the DC coefficient. It is defined for every block within a frame and is of size <size_y*size_x*nframes*int/64>

DCT_energy_metric describes a list of metrics for the whole segment-based on the individual DCT energies of each block. The metrics are represented as an ordered list of <int> values with the following meaning: mean, max, min, variance, standard deviation of all the individual DCT energy metrics. The size of the descriptor is <6*int>. An alternative implementation of this descriptor is to describe the DCT energy metric for every single frame of the video segment.

DCT_activity_metric describes a list of metrics for the whole segment-based on the individual DCT activities of each block. The metrics are represented as an ordered list of <int> values with the following meaning: mean, max, min, variance, standard deviation of all the individual DCT activity metrics. The size of the descriptor is <6*int>. An alternative implementation of this descriptor is to describe the DCT activity metric for every single frame of the video segment.

FIG. 16 depicts the transcoding hints state metadata, which may be associated to the whole audio-visual content or to a specific A/V segment according to an embodiment of the invention. Relevant Descriptors and Description Schemes may include:

M is of type <int> and describes the I-frame/P-frame distance.

bitrate_fraction_for_I is of type <float> and describes the fraction of the bit rate defined for an A/V segment that is available for I frames.

bitrate_fraction_for P is of type <float> and describes the fraction of the bit rate defined for an A/V segment that may be used for P frames. The bit rate fraction for B-frames is the rest of the percentage to 100%.

quantizer_scale_ratio_I_P is of type <float> and denotes the relation of the quantizer scale (as defined for this segment) between I- and P-frames.

quantizer_scale_ratio_I_B is of type <float> and denotes the relation of the quantizer scale (as defined for this segment) between I- and B-frames. It is noted that either the bit rate descriptors Bitrate_fraction for_I<bitrate_fraction_for_P), the quantizer_scale_ratio descriptors (quantizer_scale_ratio_I_P, quantizer_scale_ratio_I_B) or the following rate-control parameters may be mandatory.

X_I, X_P, X_B are frame_vbv_complexities and are each of type <int> and are defined in case of frame based compression target format (cf., FIG. 12). These and the following Virtual Buffer Verifier ("VBV") complexity adjustments may be optional and may be used to modify the rate control scheme according to the source content characteristics and the target format definition.

X_I top, X_P top, X B top are field_vbv_complexities for the top field and are each of type <int> and are defined in case of field based compression target format (cf. FIG. 12).

X_I bot, X_P_bot, X_B_bot are field_vbv_complexities for the bottom field and are each of type <int> and are defined in case of field based compression target format (cf. FIG. 12).

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therein.

The invention claimed is:

1. A video signal processing method for processing video signals containing video material by a server, the server executing instructions to perform the method comprising:
   separating video material from the video signals into segments, the video material comprising a plurality of frames;
   calculating a number of new feature points per frame of the video material;
   determining, for each segment, whether the number of new feature points exceeds a threshold value;
   selecting, based on the determination, one of a plurality of transcoding hints states; and
   transcoding the video material according to the selected one of a plurality of transcoding hints states.

2. A video signal processing method according to claim 1, wherein the step of separating the video material into segments comprises the steps of:
   using feature points with associated motion vectors;
   tracking the feature points; and
   determining a new video segment for transcoding based on a number of the feature points that could not be tracked from one frame to a next frame.

3. A video signal processing method according to claim 1, wherein the step of transcoding the video material comprises the steps of:
   receiving a first bitstream of compressed image data having a first GOP structure;
   extracting transcoding hints metadata from the first bitstream;
   utilizing the transcoding hints metadata associated to the first bitstream to facilitate transcoding; and
   outputting a second bitstream.

4. A video signal processing method according to claim 3, wherein the step of transcoding the Video material further comprises the step of utilizing the transcoding hints metadata associated to temporal segments of the first bitstream to facilitate transcoding.

5. A video signal processing method according to claim 3, wherein the step of transcoding the video material further comprises the step of utilizing the transcoding hints metadata associated to spatial segments of the first bitstream to facilitate transcoding.

6. A video signal processing method according to claim 3, wherein the step of transcoding the video material further comprises the step of controlling a bit rate of the second bitstream so that a bit rate of the first bitstream is different from the bit rate of the second bit stream.

7. A video signal processing method according to claim 6, wherein the step of transcoding the Video material further comprises the step of adjusting a size of pictures represented by the first bitstream so that pictures represented by the second bitstream exhibits a size different from the size of the pictures represented by the first bitstream.

8. A video signal processing method according to claim 3, wherein the step of transcoding the video material further comprises the step of adjusting a size of pictures represented by the first bitstream so that pictures represented by the second bitstream exhibit a size different from the size of the pictures represented by the first bitstream.

9. A video signal processing method according to claim 8, wherein the step of transcoding the video material further comprises the step of encoding the pictures represented by the second bitstream as field pictures when the pictures represented by the first bitstream are encoded as frame pictures.

10. A video signal processing method according to claim 8, wherein the step of transcoding the video material further comprises the step of interlacing the pictures represented by the first bitstream when the pictures represented by the first bitstream are received as a progressive sequence so that the pictures represented by the second bitstream are output as an interlaced sequence.

11. A video signal processing method according to claim 3, wherein the step of transcoding the video material further comprises the step of encoding pictures represented by the second bitstream as field pictures when pictures represented by the first bitstream are encoded as frame pictures.

12. A video signal-processing method according to claim 3, wherein the step of transcoding the video material further comprises the step of interlacing pictures represented by the first bitstream when pictures represented by the first bitstream are received as a progressive sequence so that pictures represented by the second bitstream are output as an interlaced sequence.

13. A video signal processing method according to claim 1, further comprising the steps of:
   describing transcoding target bitstream parameters;
   extracting transcoding hints metadata; and
   storing the transcoding hints metadata.

14. A video signal processing method according to claim 13, wherein the step of describing the transcoding target bitstream parameters comprises the steps of:
   defining a bit rate of a second bitstream of compressed images;
   defining a size of pictures of the second bitstream of compressed images;
   defining a number of frames per second of the second bitstream of compressed images;
   defining an aspect ratio of a pel of the second bitstream of compressed images;
   defining a color depth of each of the pel of the second bitstream of compressed images;
   defining whether progressive format is used for the second bitstream of compressed images;
   defining whether interlaced format is used for the second bitstream of compressed images;
   defining whether frame pictures are used for the second bitstream of compressed images;
   defining whether field pictures are used for the second bitstream of compressed images; and
   defining a compression method of the second bitstream of compressed images.

15. A video signal processing method according to claim 14, wherein the step of describing the transcoding target bitstream parameters further comprises the step of defining employed compression standards as defined by MPEG (Moving Pictures Expert Group).

16. A video signal processing method according to claim 14, wherein the step of describing the transcoding target bitstream parameters further comprises the step of defining employed compression standards as defined by ITU-T (International Telecommunications Union Technical Standards Group).

17. A video signal processing method according to claim 13, wherein the step of extracting the transcoding hints metadata comprises the steps of:
- receiving a first bitstream of compressed image data having a first GOP structure;
- obtaining first motion information from the first bitstream;
- obtaining texture/edge information of a first segmentation;
- obtaining feature points and associated motion information from the first bitstream; and
- obtaining region of interest information from the first bitstream.

18. A video signal processing method according to claim 17, wherein the step of extracting the transcoding hints metadata further comprises the step of storing the first motion information as transcoding hints metadata.

19. A video signal processing method according to claim 17, wherein the step of extracting the transcoding hints metadata further comprises the step of representing motion-related transcoding hints metadata as parameters of a parametric motion model.

20. A video signal processing method according to claim 19, wherein the step of extracting the transcoding hints metadata further comprises the step of employing the parametric motion model to describe a global motion within subsequent rectangular video frames.

21. A video signal processing method according to claim 19, wherein the step of extracting the transcoding hints metadata further comprises the step of employing the parametric motion model to describe a motion within a defined region of arbitrary shape.

22. A video signal processing method according to claim 21, wherein the parametric motion model is employed to describe the motion within the defined region of arbitrary shape as used within MPEG-4.

23. A video signal processing method according to claim 17, wherein the step of extracting the transcoding hints metadata further comprises the step of representing motion-related transcoding hints metadata as an array of motion vectors contained in the first bitstream of the compressed image data.

24. A video signal processing method according to claim 17, wherein the step of extracting the transcoding hints metadata further comprises the step of representing motion-related transcoding hints metadata as an array of motion vectors derived from motion vectors contained in the first bitstream of the compressed image data.

25. A video signal processing method according to claim 17, wherein the step of extracting the transcoding hints metadata further comprises the step of representing motion-related transcoding hints metadata as a list of feature points with associated motion vectors, which are tracked within subsequent frames.

26. A video signal processing method according to claim 17, wherein the step of extracting the transcoding hints metadata further comprises the step of representing motion-related transcoding hints metadata as a list of feature points with associated motion vectors, which are tracked within arbitrarily shaped regions, within subsequent frames.

27. A video signal processing method according to claim 17, wherein the step of extracting the transcoding hints metadata further comprises the step of representing texture-related transcoding hints metadata as one of a list of DCT-coefficients and a measure (one of mean, minimum, maximum, variance, and standard deviation) derived thereof.

28. A video signal processing method according to claim 17, wherein the step of extracting the transcoding hints metadata further comprises the step of representing edge-related transcoding hints metadata as one of a list of DCT-coefficients and a measure derived thereof, the measure being one of mean, minimum, maximum, variance, or standard deviation.

29. A video signal processing method according to claim 17, wherein the step of extracting the transcoding hints metadata further comprises the step of representing the feature points and associated motion-related transcoding hints metadata as a list.

30. A video signal processing method according to claim 17, wherein the step of extracting the transcoding hints metadata further comprises the step of representing encoding-complexity-related transcoding hints metadata as a complexity metric derived from the feature points tracked within subsequent frames by using a number of lost and new feature points from one frame to a next frame.

31. A video signal processing method according to claim 13, wherein the step of storing the transcoding hints metadata comprises the step of maintaining a buffer containing transcoding hints metadata for several situations.

32. A video signal processing method according to claim 31, wherein the step of storing the transcoding hints metadata further comprises the step of storing individual general transcoding hints metadata for several target devices.

33. A video signal processing method according to claim 31, wherein the step of storing the transcoding hints metadata further comprises the step of storing general transcoding hints metadata for video segments of varying scene activity.

34. An apparatus for processing supplied video signals, comprising:
- a segmenting unit for separating video material into segments, the video material comprising a plurality of frames;
- a calculation unit for calculating a number of new features points per frame of the video material;
- a determination unit for determining, for each segment, whether the number of new feature points exceeds a threshold value;
- a selection unit for selecting, based on the determination, one of a plurality of transcoding hints states; and
- a transcoding unit for transcoding the video material according to the selected one of a plurality of transcoding hints states.

35. The apparatus of claim 34, further comprising:
- a target buffer for storing at least one description of transcoding target bitstream parameters;
- an extraction unit for extracting transcoding hints metadata based on the at least one description;
- a buffer for storing the transcoding hints metadata.

* * * * *

UNITED STATES PATENT AND TRADEMARK OFFICE
CERTIFICATE OF CORRECTION

PATENT NO. : 7,738,550 B2  Page 1 of 1
APPLICATION NO. : 10/009119
DATED : June 15, 2010
INVENTOR(S) : Peter Kuhn It is certified that error appears in the above-identified patent and that said Letters Patent is hereby corrected as shown below:

*In claim 4, column 15, line 44, "the Video" should read --the video--.

*In claim 7, column 15, line 59, "the Video" should read --the video--.

In claim 7, column 15, line 62, "exhibits" should read --exhibit--.

In claim 34, column 18, lines 42-43, "new features points" should read --new feature points--.

In claim 35, column 18, line 56, after "description;", insert --and--.

Signed and Sealed this

Ninth Day of November, 2010

David J. Kappos
*Director of the United States Patent and Trademark Office*